(12) United States Patent
Thieme et al.

(10) Patent No.: US 10,501,367 B2
(45) Date of Patent: Dec. 10, 2019

(54) CERAMICS AND GLASS CERAMICS EXHIBITING LOW OR NEGATIVE THERMAL EXPANSION

(71) Applicant: Fraunhofer-Gesellschaft zur Förderung der angewandten Forschung e.V., München (DE)

(72) Inventors: Christian Thieme, Jena (DE); Christian Ruessel, Jena (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 15/742,236

(22) PCT Filed: Jul. 5, 2016

(86) PCT No.: PCT/EP2016/065876
§ 371 (c)(1),
(2) Date: Jan. 5, 2018

(87) PCT Pub. No.: WO2017/005752
PCT Pub. Date: Jan. 12, 2017

(65) Prior Publication Data
US 2018/0201539 A1    Jul. 19, 2018

(30) Foreign Application Priority Data
Jul. 6, 2015 (DE) .................. 10 2015 110 831

(51) Int. Cl.
| | | |
|---|---|---|
| *C03C 10/04* | (2006.01) | |
| *C03B 19/06* | (2006.01) | |
| *C04B 35/16* | (2006.01) | |
| *C03C 10/00* | (2006.01) | |
| *C03C 8/04* | (2006.01) | |
| *C04B 35/626* | (2006.01) | |
| *C03C 3/06* | (2006.01) | |
| *C04B 35/453* | (2006.01) | |
| *C04B 35/645* | (2006.01) | |

(52) U.S. Cl.
CPC ........ *C03C 10/0054* (2013.01); *C03B 19/063* (2013.01); *C03C 3/06* (2013.01); *C03C 8/04* (2013.01); *C03C 10/0009* (2013.01); *C03C 10/0027* (2013.01); *C04B 35/453* (2013.01); *C04B 35/6261* (2013.01); *C04B 35/6455* (2013.01); *C03C 2204/00* (2013.01); *C03C 2209/00* (2013.01); *C04B 2235/3436* (2013.01); *C04B 2235/76* (2013.01); *C04B 2235/9607* (2013.01)

(58) Field of Classification Search
CPC ........ C03C 10/00; C03C 10/0009; C03C 8/24
See application file for complete search history.

(56) References Cited

U.S. PATENT DOCUMENTS

| | | |
|---|---|---|
| 4,959,330 A | 9/1990 | Donohue et al. |
| 5,010,041 A | 4/1991 | Koyama et al. |
| 5,919,720 A | 7/1999 | Sleight et al. |
| RE39,437 E | 12/2006 | Yamaguchi et al. |
| 9,487,433 B2 * | 11/2016 | Maeda .............. C03C 8/04 |
| 2009/0075802 A1 * | 3/2009 | Badding .............. C03C 3/087 501/5 |
| 2010/0009203 A1 | 1/2010 | Nageno et al. |
| 2011/0198029 A1 * | 8/2011 | Schoen ................ C03C 3/064 156/325 |
| 2015/0031524 A1 | 1/2015 | Takayama |
| 2015/0360994 A1 | 12/2015 | Maeda et al. |
| 2016/0031748 A1 | 2/2016 | Maeda et al. |

FOREIGN PATENT DOCUMENTS

| | | |
|---|---|---|
| DE | 2 132 788 C | 5/1972 |
| DE | 142 037 | 6/1980 |
| DE | 39 27 174 A1 | 2/1990 |
| DE | 10 2013 009 001 A1 | 11/2014 |
| EP | 0 995 723 A1 | 4/2000 |
| GB | 1 347 837 A | 2/1974 |
| WO | 02/22521 A1 | 3/2002 |
| WO | 2005/009916 A1 | 2/2005 |

(Continued)

OTHER PUBLICATIONS

J.H. Lin et al., "Phase transition and crystal structures of $BaZn_2Si_2O_7$," Journal of Physics and Chemistry of Solids, vol. 60, 1999, pp. 975-983.

G D Barrera et al., "Negative thermal expansion," Journal of Physics: Condensed Matter, vol. 17, 2005, pp. R217-R252.

Joseph N. Grima et al., "Negative Thermal Expansion," Journal of the Malta Chamber of Scientists, 2006, pp. 17-29.

Marita Kerstan et al., "Thermal expansion of $Ba_2ZnSi_2O_7$, $BaZnSiO_4$ and the solid solution series $BaZn_{2-x}Mg_xSi_2O_7$ ($0 \le x \le 2$) studied by high-temperature X-ray diffraction and dilatometry," Journal of Solid State Chemistry, vol. 188, 2012, pp. 84-91.

Christian Thieme et al., "High thermal expansion in the solid solution series $BaM_{x-x}Ni_xSi_2O_7$ (M=Zn, Mg, Co)-the effect of Ni-concentration on phase transition and expansion," Journal of Material Sciences, vol. 50, 2015, pp. 3416-3424.

(Continued)

*Primary Examiner* — Karl E Group
(74) *Attorney, Agent, or Firm* — DLA Piper LLP (US)

(57) ABSTRACT

Ceramics and glass-ceramics have low and/or negative coefficients of thermal expansion. Crystalline phases of the formula $AM_2Si_{2-y}Ge_yO_7$ (A=Sr and Ba and M=Zn, Mg, Ni, Co, Fe, Cu, Mn, with Sr, Ba and Zn necessarily having to be present) can be produced by conventional ceramic processes or by crystallization from glasses. The compositions form solid solutions, where the elements indicated as component M can be replaced by one another in virtually any concentration but the concentration of Zn must always be at least 50% of the sum of all components indicated under M. The stoichiometry of these silicates and also their structure can differ to a greater or lesser extent.

16 Claims, No Drawings

(56) References Cited

FOREIGN PATENT DOCUMENTS

WO        2014/103973 A1     7/2014
WO        2014/157679 A1    10/2014

OTHER PUBLICATIONS

Christian Thieme et al., "New Family of Materials with Negative Coefficients of Thermal Expansion: The Effect of MgO, CoO, MnO, NiO, or CuO on the Phase Stability and Thermal Expansion of Solid Solution Phases Derived from $BaZn_2Si_2O_7$," Inorganic Chemistry, vol. 55, 2016, pp. 4476-4484.

* cited by examiner

CERAMICS AND GLASS CERAMICS EXHIBITING LOW OR NEGATIVE THERMAL EXPANSION

TECHNICAL FIELD

This disclosure relates to ceramics and glass-ceramics having low and/or negative coefficients of thermal expansion.

BACKGROUND

Most materials expand when the temperature is increased. However, there are some materials that contract or expand only very little with increasing temperature. One of the best known examples of a product composed of glass-ceramic without significant thermal expansion is Ceran® from Schott and is used, for example, to produce a glass-ceramic cooking area. Such a cooking area contains the main constituents $SiO_2$, $Al_2O_3$ and $Li_2O$. The expansion behavior is decisively achieved by the crystallization of lithium aluminosilicates having low or negative expansion. In the relevant temperature range, such materials have a coefficient of thermal expansion close to zero. Even numerous thermal stressing cycles and temperature shocks bring about only very low thermal stresses in such materials, which usually do not lead to mechanical failure, i.e., fracture. A disadvantage is that very high process temperatures, sometimes above 1600° C., have to be generated in the production of such glass-ceramics.

Such zero-expansion materials are also used for precision applications, e.g., large-area telescope mirrors or in microoptics. Those materials are naturally conceivable in many fields of application in which thermal shock resistance over a more or less wide temperature range is required, e.g., in the case of cookware.

The abovementioned negative or very low thermal expansion can be achieved by crystalline phases having low or negative expansion, e.g., β-spodumene (high-temperature modification of $LiAlSi_2O_6$), β-eucryptite ($LiAlSiO_4$), cordierite ($Mg_2Al_2Si_5O_{18}$), high-temperature quartz or β-quartz mixed crystals. These are well known and described in detail in various articles (e.g., in J. N. Grima, V. Zammit, R. Gatt, Xjenza 11, 2006, 17-29 or in G. D. Barrera, J. A. O. Bruno, T. H. K. Barron, N. L. Allan, J. Phys.: Condens. Matter 17, 2005, R217-R252).

Apart from various glass-ceramics, fused silica also has a very low coefficient of expansion ($0.5 \cdot 10^{-6}$ $K^{-1}$) that can be reduced further by doping with $TiO_2$. However, production of that material is difficult, complicated and therefore expensive because of the extremely high melting temperatures (>2200° C.).

Further crystalline phases having a negative thermal expansion are $ZrW_2O_8$, $HfW_2O_8$, $ZrV_2O_7$ and $HfV_2O_7$ as described in WO 02/22521 A1. However, nothing has been said hitherto about glasses from which those phases were crystallized and then have a coefficient of thermal expansion close to zero. In addition, those materials are usually expensive (especially in the case of tungsten compounds) and can contain toxic components (vanadium compounds). Further publications describing materials displaying negative or low expansion are indicated below.

U.S. Pat. No. 5,919,720 A describes a variety of phases of the formula $A_{2-x}^{3+}A_y^{4+}M_z^{3+}M_{3-y}^{6+}P_yO_{12}$ having negative and low coefficients of expansion. In US '720, $ScHoW_3O_{12}$ and $Al_{1.5}In_{0.5}W_3O_{12}$, for example, have coefficients of expansion of $-7 \cdot 10^{-6}$ $K^{-1}$ and $1 \cdot 10^{-6}$ $K^{-1}$. Those components are phases which can be produced, for example, via solid-state reactions. However, production of conventional silicate or borosilicate glasses from which large amounts of those phases crystallize does not appear to be possible. It can therefore be assumed that those phases cannot be crystallized from glasses in volume concentrations that would be high enough to bring about a very low coefficient of thermal expansion in the overall material.

Glass-ceramics having a low expansion, e.g., such as Ceran® are generally produced by melting and subsequent crystallization of glasses from the system $Li_2O$—$Al_2O_3$—$SiO_2$. Such lithium aluminosilicate glasses are, for example, described in EP 0 995 723 B1, US RE 29 437 E and DE 39 27 174 A1, but they all require particularly high melting temperatures.

In some publications, alkaline earth metal oxides are possible as additives. However, those oxides are not added to influence the crystal phase, but merely to alter the properties of the glass.

DD 142 037 A1 describes a lithium aluminosilicate glass in which BaO is used to improve the crystallization behavior and reduce the viscosity. However, BaO is known to bring about a significant increase in the coefficient of expansion of a glass.

DE 21 32 788 C also describes glasses doped by incorporation of up to 2% by weight of BaO and/or CaO and up to 12% by weight of rare earth metal oxides, but those increase the coefficient of expansion. Here too, the negative expansion is achieved, inter alia, by crystals having the same structure type as β-quartz. The high-temperature quartz structure is stabilized by aluminum oxide and also monovalent ($Li_2O$, $Na_2O$) or divalent (ZnO, MgO) oxides. Very high melting temperatures of 1550 to 1600° C. are mentioned.

WO 2005/009 916 A1 states that the negative expansion can be achieved by crystallization of β-eucryptite and β-quartz. Both ZnO and also BaO and/or SrO may be added. However, incorporation of those constituents into crystal phases is not mentioned. In the working examples, a minimum melting temperature of 1480° C. is indicated.

In general, it can be concluded that alkaline earth metal oxides such as BaO or SrO have hitherto been added to the glasses only to reduce the melting temperature, perhaps also to suppress the tendency for crystallization to occur. This addition could be made only in small amounts since oxides of this type increase the coefficient of thermal expansion of the glass-ceramics.

It can be seen from the above overview in the field of materials having low or negative expansion that only a very limited number of crystalline phases having no thermal expansion or a negative thermal expansion in the temperature range T>20° C. are known. Mainly phases that can be crystallized from aluminosilicate glasses are used commercially. They are usually based on the $Li_2O$—$Al_2O_3$—$SiO_2$ system. However, glasses of that system have very high melting temperatures, usually significantly above 1550° C. This accordingly leads to high energy costs and in particular to a high degree of technical complication.

All published silicate compositions having a low or negative coefficient of thermal expansion are aluminosilicate compositions having the disadvantages indicated above.

It could therefore be helpful to provide a possible way of producing ceramics and/or glass-ceramics having a low or else negative thermal expansion with a very small outlay at a low melting temperature.

SUMMARY

We provide a material based on $Ba_{1-x}Sr_xM_2Si_{z-y}Ge_yO_7$ with 0<x<1 and 0≤y≤2, where M has at least Zn as constituent and is selected from the group consisting of Zn, Mg, Mn, Co, Ni, Fe and Cu, such that the material has a negative coefficient of thermal expansion or a coefficient of linear thermal expansion of $<1 \cdot 10^{-6} K^{-1}$.

We also provide a glass-ceramic or ceramic producing including the material based on $Ba_{1-x}Sr_xM_2Si_{2-y}Ge_yO_7$ with $0<x<1$ and $0 \leq y \leq 2$, where M has at least Zn as constituent and is selected from the group consisting of Zn, Mg, Mn, Co, Ni, Fe and Cu, such that the material has a negative coefficient of thermal expansion or a coefficient of linear thermal expansion of $<1 \cdot 10^{-6} K^{-1}$.

We further provide a method of producing the material based on $Ba_{1-x}Sr_xM_2Si_{2-y}Ge_yO_7$ with $0<x<1$ and $0 \leq y \leq 2$, where M has at least Zn as constituent and is selected from the group consisting of Zn, Mg, Mn, Co, Ni, Fe and Cu, such that the material has a negative coefficient of thermal expansion or a coefficient of linear thermal expansion of $<1 \cdot 10^{-6} K^{-1}$, including sintering amorphous powders, with densification by viscous flow commencing before crystallization of the crystal phase occurs at an end portion of the sintering.

We also further provide a method of providing the material based on $Ba_{1-x}Sr_xM_2Si_{2-y}Ge_yO_7$ with $0<x<1$ and $0 \leq y \leq 2$, where M has at least Zn as constituent and is selected from the group consisting of Zn, Mg, Mn, Co, Ni, Fe and Cu, such that the material has a negative coefficient of thermal expansion or a coefficient of linear thermal expansion of $<1 \cdot 10^{-6} K^{-1}$, including sintering crystalline powders which contain the crystal phase.

DETAILED DESCRIPTION

A very low coefficient of expansion means $-1 \cdot 10^{-6} K^{-1}$ to $1 \cdot 10^{-6} K^{-1}$.

We provide crystalline phases of the formula $AM_2Si_2O_7$ (A=Sr, Ba and M=Zn, Mg, Fe, Ni, Co, Cu, Mn) that can be produced by conventional ceramic processes or crystallization from glasses. The compositions indicated form solid solutions, with the elements indicated as component M being able to be replaced by one another in virtually any concentration. The stoichiometry of these silicates and their structure can differ to a greater or lesser extent. $SiO_2$ can also be replaced by $GeO_2$.

The compound $BaZn_2Si_2O_7$ is present as monoclinic low-temperature phase at room temperature and this is transformed at 280° C. into an orthorhombic high-temperature phase (J. H. Lin, G. X. Lu, J. Du, M. Z. Su, C.-K Loong, J. W. Richardson Jr., J. Phys. Chem. Solids 60, 1999, 975-983). The coefficient of thermal expansion of the low-temperature phase is very high, at $13-16 \cdot 10^{-6} K^{-1}$, the phase transformation is associated with a volume increase of 2.8% and the high-temperature phase then has, depending on composition, a very small or even negative thermal expansion at high temperature (M. Kerstan, M. Müller, C. Rüssel, J. Solid State Chem. 188, 2012, 84-91).

Incorporation of SrO into crystals of the formula $AM_2Si_2O_7$ (A=Ba, Sr and M=predominantly Zn, in addition also Mg, Fe, Ni, Co, Cu, Mn) effects stabilization of the high-temperature phase having a low and/or negative expansion so that this is also stable at room temperature. The component M should always have Zn as a main constituent, i.e., the proportion of Zn in the component M should be >50%. If, in addition to SrO, relatively high concentrations of Co, Mg, Fe, Ni, Cu and Mn are incorporated instead of Zn, this leads to stabilization of high-expansion phases having the structure of low-temperature $BaZn_2Si_2O_7$. However, relatively small concentrations of Co, Mg, Fe, Ni, Cu and Mn can be incorporated into the crystal without the low-temperature phase being stabilized. This means that the high-temperature phase is retained at room temperature even on incorporation of Co, Mg, Fe, Ni, Cu and Mn.

The material can be sintered from powders, with the above-described $Ba_{1-x}Sr_xM_2Si_2O_7$ phase being the main crystal phase. The powder used for sintering can, however, contain one or more other crystalline or amorphous phases. The powders described can be produced by solid-state reactions from, for example, oxides and carbonates or else by other methods, for example, by sol-gel or coprecipitation processes or else by gas-phase reactions.

The material can also be obtained by controlled crystallization of glass. This is possible because the components of the crystalline phases are also constituents of many relatively crystallization-stable glasses. If an only relatively small amount of $SiO_2$ is added to a $Ba_{1-x}Sr_xM_2Si_2O_7$ composition, a relatively stable glass can be obtained. The stability of the glass can be further improved by addition of further components such as, for example, $B_2O_3$, $La_2O_3$ or $ZrO_2$, since these components in low concentrations suppress nucleation in our chemical compositions. However, in higher concentrations, $La_2O_3$ or $ZrO_2$ can have the opposite effect, i.e., cause nucleation and thus crystallization, and consequently act as nucleating agents.

Since most glasses and glass-ceramics having high proportions of BaO and/or SrO have a very high coefficient of thermal expansion, the coefficient of expansion of glass-ceramics can be varied within a wide range by variation of the BaO/SrO ratio without important glass properties, e.g., the glass transition temperature or the coefficient of expansion of the pure glass, being significantly altered.

Furthermore, the component M is also of considerable importance in the composition $Ba_{1-x}Sr_xM_2Si_2O_7$. In M=Zn, the crystalline phase can be stabilized as soon as approximately 10 mol % of the BaO is replaced by SrO. Incorporation of components other than Zn also leads to stabilization of the high-expansion low-temperature phase. As component M, it is possible to use ions of the following divalent metals: Mg, Ni, Co, Fe, Cu, Mn.

If too much Zn is replaced by other components, the low-temperature phase which has a high coefficient of expansion is stabilized. This effect makes it possible to produce glasses having approximately the same properties, but whose expansion behavior after crystallization can be varied considerably. These glass-ceramics therefore represent a possible way of controlling the coefficient of expansion in a targeted manner within a wide range.

Our ceramics and glass ceramic are illustrated below with the aid of working examples.

Working Example 1

The compositions indicated in the following table are produced by conventional ceramic processes (solid-state reaction). This means that the starting raw materials are heated below the liquidus temperature for 30-50 hours. During this time, the powders are repeatedly milled and homogenized (4 to 10 times). Phase purity is checked by x-ray powder diffraction. $BaCO_3$, $SrCO_3$, ZnO, $SiO_2$, $GeO_2$, MgO, $MnCO_3$, NiO, $Fe(COO)_2 \cdot 2H_2O$, $Co_3O_4$ and CuO are used as raw materials. Two crystal structures can be stabilized. X-ray powder diffraction is used to check whether the monoclinic or orthorhombic modification is stable at room temperature. The latter has the desired negative thermal expansion. Which of the two phases is stable at room temperature can be seen in the table. In some compositions, the two phases are present side-by-side. The iron-containing samples were produced under an argon atmosphere.

| Composition | Ortho-rhombic | Mono-clinic | Production temp. [° C.] | Foreign phases |
|---|---|---|---|---|
| $BaZn_2Si_2O_7$ | | x | 1200-1250 | — |
| $Ba_{0.96}Sr_{0.04}Zn_2Si_2O_7$ | | x | 1200-1250 | — |
| $Ba_{0.94}Sr_{0.06}Zn_2Si_2O_7$ | | x | 1200-1250 | — |
| $Ba_{0.9}Sr_{0.1}Zn_2Si_2O_7$ | x | x | 1150-1200 | — |
| $Ba_{0.8}Sr_{0.2}Zn_2Si_2O_7$ | x | | 1150-1200 | — |
| $Ba_{0.5}Sr_{0.5}Zn_2Si_2O_7$ | x | | 1200-1250 | — |
| $Ba_{0.1}Sr_{0.9}Zn_2Si_2O_7$ | x | | 1150-1200 | — |
| $Ba_{0.01}Sr_{0.99}Zn_2Si_2O_7$ | x | | 1150-1200 | $Sr_2ZnSi_2O_7$, $Zn_2SiO_4$ |
| $Ba_{0.5}Sr_{0.5}Zn_{1.5}Mg_{0.5}Si_2O_7$ | x | | 1250-1300 | — |
| $Ba_{0.5}Sr_{0.5}Zn_{1.3}Mg_{0.7}Si_2O_7$ | x | x | 1250-1320 | — |
| $Ba_{0.5}Sr_{0.5}Zn_{1.5}Co_{0.5}Si_2O_7$ | x | | 1250-1300 | — |
| $Ba_{0.5}Sr_{0.5}ZnCoSi_2O_7$ | | x | 1200-1250 | — |
| $Ba_{0.5}Sr_{0.5}Zn_{1.9}Mn_{0.1}Si_2O_7$ | x | | 1250-1300 | — |
| $Ba_{0.5}Sr_{0.5}Zn_{1.5}Mn_{0.5}Si_2O_7$ | x | x | 1150-1200 | — |
| $Ba_{0.5}Sr_{0.5}Zn_{1.8}Ni_{0.2}Si_2O_7$ | x | | 1150-1200 | — |
| $Ba_{0.5}Sr_{0.5}Zn_{1.7}Ni_{0.3}Si_2O_7$ | x | x | 1100-1150 | — |
| $Ba_{0.5}Sr_{0.5}Zn_{1.6}Ni_{0.4}Si_2O_7$ | x | x | 1150-1200 | — |
| $Ba_{0.5}Sr_{0.5}Zn_{1.9}Cu_{0.1}Si_2O_7$ | x | | 1150-1200 | — |
| $Ba_{0.5}Sr_{0.5}Zn_{1.7}Cu_{0.3}Si_2O_7$ | x | x | 1100-1150 | — |
| $Ba_{0.5}Sr_{0.5}Zn_{1.5}Cu_{0.5}Si_2O_7$ | | x | 1050-1100 | — |
| $Ba_{0.5}Sr_{0.5}Zn_2Si_{1.9}Ge_{0.1}O_7$ | x | | 1250-1350 | — |
| $Ba_{0.5}Sr_{0.5}Zn_{1.7}Fe_{0.3}Si_2O_7$ | x | | 1030-1060 | — |

Powders that predominantly contain the orthorhombic modification display, after prior isostatic pressing and subsequent sintering, negative or very low coefficients of thermal expansion.

Working Example 2

Production of a ceramic having the composition $Ba_{0.2}Sr_{0.8}Zn_2Si_2O_7$ by the acetates and also colloidal $SiO_2$.

For this purpose, barium acetate, strontium acetate and zinc acetate are dissolved in the correct stoichiometry in deionized water. The appropriate amount of colloidal $SiO_2$ having a particle size of ≤50 nm is added to the dissolved acetates. While stirring continually, the water is evaporated over a period of one day until a viscous mass is formed. This is dried, milled by a ball mill, mixed with a 1% strength solution of polyvinyl alcohol in water and dried again. The powder obtained is subsequently uniaxially pressed and sintered at 1130° C. The ceramic obtained is examined by X-ray powder diffraction. The crystal structure corresponds to that of high-temperature $BaZn_2Si_2O_7$, as was also found in Working Example 1. The ceramic is phase-pure and displays a coefficient of linear thermal expansion of $-12 \cdot 10^{-6}$ $K^{-1}$.

Working Example 3

A glass having the composition $8BaO.8SrO.34ZnO.46SiO_2.1ZrO_2.3La_2O_3$ is melted at a temperature of 1450° C. in a platinum crucible. The glass displays a very low viscosity (<10 Pas) at this temperature. Crystallization of a cylindrical specimen having a length of about 20 mm and a diameter of about 8 mm at 900° C. for five hours gives a coefficient of linear thermal expansion of $0.5 \cdot 10^{-6} K^{-1}$ (measured in the temperature range of 25 to 300° C.).

Working Example 4

A glass having the composition $8BaO.8SrO.30ZnO.5MgO.45SiO_2.2ZrO_2.2La_2O_3$ is melted at 1400-1450° C. in a platinum crucible. After crystallization at 900° C. for five hours, the glass has a coefficient of linear thermal expansion of $-2 \cdot 10^{-6} K^{-1}$ (measured in the temperature range of 25 to 300° C.).

Working Example 5

A glass having the composition $8BaO.8SrO.30ZnO.5CoO.45SiO_2.1ZrO_2.1La_2O_3.2B_2O_3$ is melted at 1350-1450° C. in an $Al_2O_3$ crucible. After crystallization at 900° C. for five hours, the glass-ceramic has a coefficient of linear thermal expansion of $-2.4 \cdot 10^{-6}$ $K^{-1}$ (measured in the temperature range of 25 to 300° C.).

Working Example 6

A glass having the composition $8BaO.8SrO.34ZnO.44SiO_2.1ZrO_2.1La_2O_3.4B_2O_3$ is comminuted to an average particle size of ≤10 μm. The glass powder obtained in this way is mixed with a 1% strength solution of polyvinyl butyral in water and dried. The powder is subsequently cold isostatically pressed with the aid of a silicone mold. The compact is finally sintered at 900° C. for five hours. During heating, the powder is densified by viscous flow, and the glass subsequently crystallizes. A coefficient of linear thermal expansion of $4.1 \cdot 10^{-6}$ $K^{-1}$ is obtained in the temperature range of 100 to 500° C.

Working Example 7

A glass having the composition $7.5BaO.7.5SrO.32ZnO.47SiO_2.5ZrO_2.1La_2O_3$ is melted at 1350-1450° C. The glass transition temperature is 695° C. Crystallization at 815° C. for 20 hours leads to formation of crystals having the composition $Ba_{0.5}Sr_{0.5}Zn_2Si_2O_7$. Small amounts of $ZrO_2$ additionally crystallize. The latter acts as nucleating agent. The glasses crystallized at 815° C. have a coefficient of linear thermal expansion of $-2.1 \cdot 10^{-6}$ $K^{-1}$.

Working Example 8

A ceramic having the composition $Sr_{0.5}Ba_{0.5}Zn_{1.9}Ni_{0.1}Si_2O_7$ is produced by a solid-state reaction. For this purpose, the appropriate amounts of $BaCO_3$, $SrCO_3$, ZnO, NiO and $SiO_2$ are slurried in ethanol and subsequently milled in a planetary mill to an average particle size of <3 μm. The mixture of starting materials and ethanol is subsequently dried at 110° C. for three hours. The powder formed in this way is converted into the corresponding virtually phase-pure ceramic by a heat treatment at 1200° C. for ten hours. The ceramic is then once again milled to an average particle size of <3 μm and uniaxially pressed. The compact is subsequently sintered at 1200° C. for ten hours. A dilatometric measurement indicates a coefficient of expansion of $-19.3 \cdot 10^{-6} K^{-1}$ in the temperature range of 100 to 300° C.

Working Example 9

A glass having the composition $8BaO8SrO30ZnO5MgO45SiO_23B_2O_3$ is melted at 1350° C. in a platinum crucible. The raw materials $BaCO_3$, $SrCO_3$, ZnO, MgO, $SiO_2$ and $H_3BO_3$ are used for this purpose. The glass is poured into a steel mold which has been preheated to 700° C. and subsequently transferred into a cooling furnace that has likewise been preheated to 700° C., and subsequently cooled at 2 K/min. Crystallization of the glass block in the temperature range of 700 to 780° C. produces a glass-ceramic which has a thermal expansion close to zero, measured in the temperature range from room temperature to 650° C. This can thus be used as support material for optical components.

Materials made from the compositions can thus be utilized in oven windows, cookware, telescope mirrors and other passive elements for optical technologies. Glasses having $SiO_2$ concentrations of >98%, borosilicate glasses or glass-ceramics based on lithium aluminosilicate having a thermal expansion of virtually zero can comprise such materials. We also provide glazing products having low coefficients of thermal expansion and $SiO_2$ concentrations of >98%, borosilicate glasses or glass-ceramics based on lithium aluminosilicate having a thermal expansion of virtually zero comprised of such materials.

The invention claimed is:

1. A material based on a crystal phase of composition $Ba_{1-x}Sr_xM_2Si_{2-y}Ge_yO_7$ with $0.1<x<1$ and $0\leq y\leq 2$, where M comprises Zn as a constituent such that the material has a negative coefficient of thermal expansion or a coefficient of linear thermal expansion of $<1\cdot 10^{-6}K^{-1}$.

2. The material as claimed in claim 1, wherein M contains at least one further constituent selected from the group consisting of Mg, Mn, Co, Ni, Fe and Cu.

3. The material as claimed in claim 1, wherein the crystal phase is present in a volume concentration of >50% and other phases present being other crystal phases or one or more glass phases of a different chemical composition.

4. The material as claimed in claim 1, wherein the crystal phase has been crystallized from a glass.

5. A glass-ceramic or ceramic product comprising the material as claimed in claim 1.

6. A method of producing the material as claimed in claim 1, comprising sintering amorphous powders, with densification by viscous flow commencing before crystallization of the crystal phase occurs at an end portion of the sintering.

7. A method of producing the material as claimed in claim 1, comprising sintering crystalline powders which contain the crystal phase.

8. Oven windows comprising the material as claimed in claim 1.

9. Cookware comprising the material as claimed in claim 1.

10. Telescope mirrors or other passive elements for optical technologies comprising the material as claimed in claim 1.

11. Joining material having low coefficients of thermal expansion comprising the material as claimed in claim 1.

12. Glazing material having low coefficients of thermal expansion comprising the material as claimed in claim 1.

13. The material as claimed in claim 2, wherein a sum of concentration(s) of the at least one further constituent does not exceed the concentration of Zn.

14. The material as claimed in claim 1, wherein the composition is selected from the group consisting of $Ba_{0.9}Sr_{0.1}Zn_2Si_2O_7$, $Ba_{0.8}Sr_{0.2}Zn_2Si_2O_7$, $Ba_{0.5}Sr_{0.5}Zn_2Si_2O_7$, $Ba_{0.1}Sr_{0.9}Zn_2Si_2O_7$, $Ba_{0.01}Sr_{0.99}Zn_2Si_2O_7$, $Ba_{0.5}Sr_{0.5}Zn_{1.5}Mg_{0.5}Si_2O_7$, $Ba_{0.5}Sr_{0.5}Zn_{1.3}Mg_{0.7}Si_2O_7$, $Ba_{0.5}Sr_{0.5}Zn_{1.5}Co_{0.5}Si_2O_7$, $Ba_{0.5}Sr_{0.5}ZnCoSi_2O_7$, $Ba_{0.5}Sr_{0.5}Zn_{1.9}Mn_{0.1}Si_2O_7$, $Ba_{0.5}Sr_{0.5}Zn_{1.5}Mn_{0.5}Si_2O_7$, $Ba_{0.5}Sr_{0.5}Zn_{1.8}Ni_{0.2}Si_2O_7$, $Ba_{0.5}Sr_{0.5}Zn_{1.7}Ni_{0.3}Si_2O_7$, $Ba_{0.5}Sr_{0.5}Zn_{1.6}Ni_{0.4}Si_2O_7$, $Ba_{0.5}Sr_{0.5}Zn_{1.9}Cu_{0.1}Si_2O_7$, $Ba_{0.5}Sr_{0.5}Zn_{1.7}Cu_{0.3}Si_2O_7$, $Ba_{0.5}Sr_{0.5}Zn_{1.5}Cu_{0.5}Si_2O_7$, $Ba_{0.5}Sr_{0.5}Zn_2Si_{1.9}Ge_{0.1}O_7$, and $Ba_{0.5}Sr_{0.5}Zn_{1.7}Fe_{0.3}Si_2O_7$.

15. The material as claimed in claim 1, wherein the composition is selected from the group consisting of $Ba_{0.8}Sr_{0.2}Zn_2Si_2O_7$, $Ba_{0.5}Sr_{0.5}Zn_2Si_2O_7$, $Ba_{0.1}Sr_{0.9}Zn_2Si_2O_7$, $Ba_{0.01}Sr_{0.99}Zn_2Si_2O_7$, $Ba_{0.5}Sr_{0.5}Zn_{1.5}Mg_{0.5}Si_2O_7$, $Ba_{0.5}Sr_{0.5}Zn_{1.5}Co_{0.5}Si_2O_7$, $Ba_{0.5}Sr_{0.5}Zn_{1.5}Mn_{0.5}Si_2O_7$, $Ba_{0.5}Sr_{0.5}Zn_{1.8}Ni_{0.2}Si_2O_7$, $Ba_{0.5}Sr_{0.5}Zn_{1.7}Ni_{0.3}Si_2O_7$, $Ba_{0.5}Sr_{0.5}Zn_{1.9}Cu_{0.1}Si_2O_7$, $Ba_{0.5}Sr_{0.5}Zn_2Si_{1.9}Ge_{0.1}O_7$, and $Ba_{0.5}Sr_{0.5}Zn_{1.7}Fe_{0.3}Si_2O_7$.

16. A material based on a crystal phase of composition $Ba_{1-x}Sr_xM_2Si_{2-y}Ge_yO_7$ with $0.1<x<1$ and $0\leq y\leq 2$, where M comprises Zn as a constituent such that the material has a negative coefficient of thermal expansion or a coefficient of linear thermal expansion of $<1\cdot 10^{-6}$ $K^{-1}$ and M further contains at least one further constituent selected from the group consisting of Mg, Mn, Co, Ni, Fe and Cu, wherein the crystal phase is present in a volume concentration of >50% and other phases present being other crystal phases or one or more glass phases of a different chemical composition, and a sum of concentration(s) of the at least one further constituent does not exceed the concentration of Zn.

* * * * *